US011612772B2

(12) United States Patent
Roth et al.

(10) Patent No.: US 11,612,772 B2
(45) Date of Patent: *Mar. 28, 2023

(54) DEFORMABLE ENERGY ABSORBER WITH DEFORMATION INDICATOR

(71) Applicant: Honeywell International Inc., Morris Plains, NJ (US)

(72) Inventors: Markus Roth, Konradsreuth (DE); Katrin Wunderlich, Bavaria (DE); Konrad Soergel, Nuremberg (DE); Klaus Baumgartner, Baden-Württemberg (DE)

(73) Assignee: Honeywell International Inc., Charlotte, NC (US)

( * ) Notice: Subject to any disclaimer, the term of this patent is extended or adjusted under 35 U.S.C. 154(b) by 489 days.

This patent is subject to a terminal disclaimer.

(21) Appl. No.: 16/567,885

(22) Filed: Sep. 11, 2019

(65) Prior Publication Data

US 2020/0023210 A1 Jan. 23, 2020

Related U.S. Application Data

(63) Continuation of application No. 14/814,028, filed on Jul. 30, 2015, now Pat. No. 10,449,400.

(30) Foreign Application Priority Data

Aug. 4, 2014 (EP) .................................... 14179775

(51) Int. Cl.
*B65G 69/22* (2006.01)
*A62B 35/00* (2006.01)
*A62B 35/04* (2006.01)

(52) U.S. Cl.
CPC .......... *A62B 35/0081* (2013.01); *A62B 35/04* (2013.01)

(58) Field of Classification Search
CPC ....... A62B 35/04; A62B 35/0081; A62B 1/14; E06C 7/003; E06C 7/186; E06C 7/187; E04G 21/32
See application file for complete search history.

(56) References Cited

U.S. PATENT DOCUMENTS 3,597,569 A * 8/1971 Gerber ..................... H05H 1/48 219/68
3,666,256 A * 5/1972 Ellis .......................... F16F 9/44 188/315

(Continued)

FOREIGN PATENT DOCUMENTS

DE 29805788 U1 7/1998
DE 102012207223 B3 9/2013

(Continued)

OTHER PUBLICATIONS

Communication under Rule 71(3) EPC received for European Application No. 14179775.3, dated Feb. 23, 2018, 6 pages.

(Continued)

*Primary Examiner* — Jerry E Redman
(74) *Attorney, Agent, or Firm* — Alston & Bird LLP

(57) ABSTRACT

Apparatus and associated methods relate to fall-protection safety connector having alignment indicators located on both a static end and a dynamic end of a deformable energy-absorbing device that when deformed visually presents the alignment indicators as misaligned. In an illustrative embodiment, the fall-protection safety connector may be
(Continued)

configured to securely connect to a securement member. In some embodiments, a user may connect to the fall-protection safety connector by attaching a lanyard to an aperture coupled to the dynamic end of the deformable energy-absorbing device. Before using the fall-protection safety connector, the user may visually inspect the alignment of the alignment indicators to ascertain the readiness of the connector. Misaligned alignment indicators may advantageously indicate to the user that the remaining energy-absorbing deformation capability of the connector may be below a predetermined specification.

15 Claims, 12 Drawing Sheets

(56) References Cited

U.S. PATENT DOCUMENTS

| | | | | |
|---|---|---|---|---|
| 4,319,108 | A * | 3/1982 | Chabala | H01H 9/16 200/308 |
| 5,332,071 | A | 7/1994 | Duncan | |
| 5,433,290 | A * | 7/1995 | Ellis | A62B 35/04 188/371 |
| 6,457,556 | B1 * | 10/2002 | Skade | A62B 35/04 188/371 |
| 6,725,969 | B1 * | 4/2004 | Meister | E06C 7/187 182/36 |
| 7,708,116 | B2 * | 5/2010 | Martin | A62B 35/0062 182/8 |
| 2005/0284694 | A1 | 12/2005 | Faye et al. | |
| 2010/0012424 | A1 * | 1/2010 | Krauss | A62B 35/04 182/3 |
| 2010/0032239 | A1 * | 2/2010 | Rinklake | E06C 7/186 188/65.1 |
| 2011/0094839 | A1 * | 4/2011 | Blomberg | A62B 35/04 219/121.72 |
| 2014/0017007 | A1 * | 1/2014 | Allen | E01C 11/18 404/134 |
| 2014/0020988 | A1 * | 1/2014 | Casebolt | A62B 1/14 188/65.1 |
| 2014/0196984 | A1 * | 7/2014 | Chabod | A63B 29/02 182/18 |
| 2016/0361577 | A1 * | 12/2016 | Perner | A62B 35/0037 |
| 2017/0128756 | A1 | 5/2017 | Schurian et al. | |

FOREIGN PATENT DOCUMENTS

| | | | |
|---|---|---|---|
| EP | 0561682 | A1 | 9/1993 |
| FR | 2972361 | A1 | 9/2012 |
| WO | 2012/158554 | A2 | 11/2012 |
| WO | 2015/183564 | A1 | 12/2015 |

OTHER PUBLICATIONS

Decision to grant a European patent received for European Application No. 14179775.3, dated Jun. 7, 2018, 2 pages.
Advisory Action (PTOL-303) dated Jul. 5, 2018 for U.S. Appl. No. 14/814,028.
Advisory Action (PTOL-303) dated Nov. 16, 2016 for U.S. Appl. No. 14/814,028.
Applicant Initiated Interview Summary (PTOL-413) dated Jan. 17, 2019 for U.S. Appl. No. 14/814,028.
Applicant Initiated Interview Summary (PTOL-413) dated Jul. 5, 2018 for U.S. Appl. No. 14/814,028.
Applicant Initiated Interview Summary (PTOL-413) dated Jun. 13, 2019 for U.S. Appl. No. 14/814,028.
Applicant Initiated Interview Summary (PTOL-413) dated Jun. 29, 2018 for U.S. Appl. No. 14/814,028.
Applicant Initiated Interview Summary (PTOL-413) dated Nov. 16, 2016 for U.S. Appl. No. 14/814,028.
Applicant Initiated Interview Summary (PTOL-413) dated Oct. 21, 2016 for U.S. Appl. No. 14/814,028.
Examination Report and Annex in EP2982417A1, dated Jul. 11, 2017, 8 pages.
Extended European Search Report and Written Opinion in EP2982417A1, dated Jan. 27, 2015, 8 pages.
Final Rejection dated Apr. 9, 2018 for U.S. Appl. No. 14/814,028.
Final Rejection dated Sep. 15, 2016 for U.S. Appl. No. 14/814,028.
Honeywell Miller, GlideLocBrochure, Literature and Documents, 2014 [online]. Retrieved on Jun. 27, 2014. Retrieved from the Internet, URL: <https:/www.millerfallprotection.com/pdfs/glidelocbrochure.pdf>.
Non-Final Rejection dated Apr. 18, 2016 for U.S. Appl. No. 14/814,028.
Non-Final Rejection dated Oct. 2, 2018 for U.S. Appl. No. 14/814,028.
Non-Final Rejection dated Sep. 28, 2017 for U.S. Appl. No. 14/814,028.
Notice of Allowance and Fees Due (PTOL-85) dated Aug. 26, 2019 for U.S. Appl. No. 14/814,028.
Notice of Allowance and Fees Due (PTOL-85) dated Jun. 13, 2019 for U.S. Appl. No. 14/814,028.

* cited by examiner

DEFORMABLE ENERGY ABSORBER WITH DEFORMATION INDICATOR

CROSS-REFERENCE TO RELATED APPLICATIONS

This application is a Continuation and claims the benefit of U.S. application Ser. No. 14/814,028, titled "Deformable Energy Absorber with Deformation Indicator," filed by Markus Roth, et al., on Jul. 30, 2015, which claims priority to Europe Application Number 14179775.3 titled "Deformable Energy Absorber with Deformation Indicator," filed by Markus Roth, et al. on Aug. 4, 2014.

This application incorporates the entire contents of the foregoing application(s) herein by reference.

TECHNICAL FIELD

Various embodiments relate generally to fall-arrest safety systems having energy absorbing members.

BACKGROUND

Many occupations require workers to work at dangerous heights. One such example is the shipping industry. Workers in this industry may be required to work on top of shipping containers or trailers of semi-trucks. Workers may need to inspect containers. Containers may require maintenance such as repair or painting. Securing containers to lifts or trucks may involve workers working above and about such containers. In some cases loading may be performed from above certain containers.

The construction industry also may expose workers to dangerous heights. High-rise building construction may require workers to operate at dangerous heights. Often these workers may operate equipment on platforms high above the ground elevation. These workers may perform duties at these heights without walls or rails surrounding these platforms. Some of these platforms may even have a slope which might facilitate falling off the platform.

Safety harnesses may be worn to protect a wearer from harm if the wearer should fall. The wearer can connect the harness to a secure anchor so as to tether the wearer to a fixed mooring. Such safety harnesses may be worn by workers operating at dangerous heights or near an edge or cliff. The workers, once safely tethered, may then perform their required employment duties.

Should a worker fall from the heights at which he/she works, harm can result. If a person's fall is arrested too abruptly, a person's skeletal system may be broken. If a person's head receives too large a stropping force, the person may receive a concussion, a broken skull, or even brain damage. If a user's fall is arrested too abruptly, the user may hemorrhage internally as a result of the blow to the body. Fallen users may be permanently handicapped by excessive forces that occur from a fall.

SUMMARY

Apparatus and associated methods relate to fall-protection safety connector having alignment indicators located on both a static end and a dynamic end of a deformable energy-absorbing device that when deformed visually presents the alignment indicators as misaligned. In an illustrative embodiment, the fall-protection safety connector may be configured to securely connect to a securement member. In some embodiments, a user may connect to the fall-protection safety connector by attaching a lanyard to an aperture coupled to the dynamic end of the deformable energy-absorbing device. Before using the fall-protection safety connector, the user may visually inspect the alignment of the alignment indicators to ascertain the readiness of the connector. Misaligned alignment indicators may advantageously indicate to the user that the remaining energy-absorbing deformation capability of the connector may be below a predetermined specification.

Various embodiments may achieve one or more advantages. For example, some embodiments may facilitate a check regarding whether or not an energy-absorbing device meets specification. For example, a user may visually inspect the alignment features, which if aligned may indicate that the fall-protection safety connector meets a predetermined safety standard. In some embodiments, the pre-use check may be performed without special tools and/or manuals. In an exemplary embodiment, a user may inspect a fall-protection safety connector anywhere that he uses it. For example, should a worker have a slight mishap while on a job site, the worker may visually inspect the fall-protection safety connector to ascertain whether he may safely continue working or whether he needs to replace the connector. In some embodiments, a fall-protection safety connector with a visual deformation indicator may prevent serious injuries due to inadequate shock absorbing devices.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary scenario in which a visual indicator of a readiness of a safety device is briefly introduced with reference to FIG. 1. Second, with reference to FIGS. 2A-2B, an exemplary fall-protection safety connector having a visual readiness indicator is described. Then, with reference to FIGS. 3-6, various exemplary embodiments of visual readiness indicators will be described. Finally, with reference to FIG. 7, an exemplary relation between a dynamic indicator position and energy absorbed by a deformation member is described.

Figure 1:
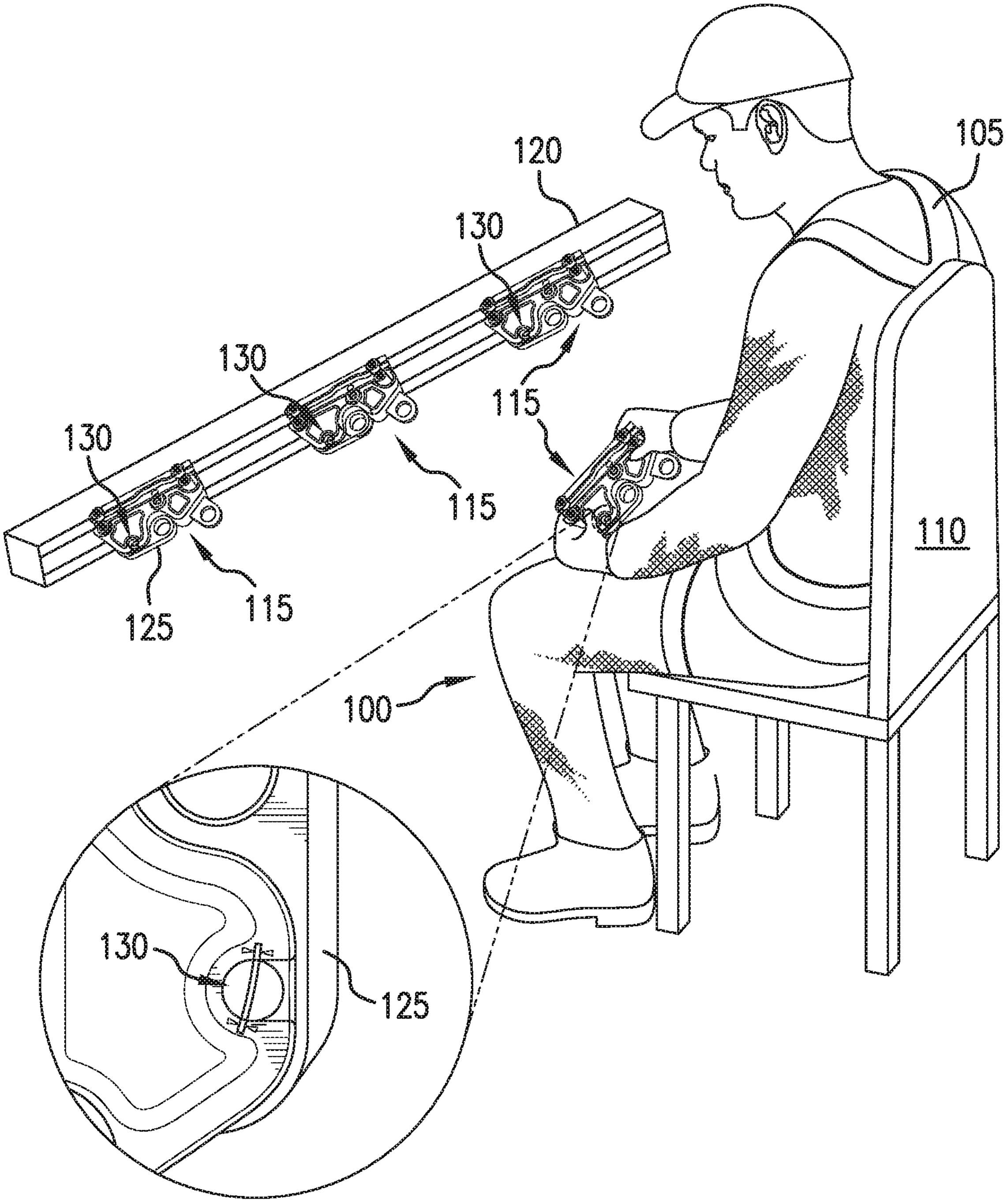
FIG. 1 depicts an exemplary scenario in which a worker is inspecting a series of fall-protection safety connectors before selecting one for use.

FIG. 1 depicts an exemplary scenario in which a worker is inspecting a series of fall-protection safety connectors before selecting one for use. In the FIG. 1 depiction, a worker 100 is preparing for a work day. The worker 100 is shown wearing a fall-protection harness 105. The worker 100 is seated in a chair 110 before a series of exemplary fall-protection safety connectors 115. Some of the fall-protection safety connector are slidably coupled to a guide rail 120. Each of the depicted fall-protection safety connectors has a deformable energy-absorbing member 125. The worker 100 is inspecting the readiness of one of the fall-protection safety connectors 115. The worker 100 is looking at a visual deformation indicator 130. The visual deformation indicator 130 may indicate whether or not the deformable energy-absorbing member 125 has been deformed. The worker 100 may then select a fall-protection safety connector 115 having a visual deformation indicator 130 that indicates that the corresponding deformable energy-absorbing member 115 is undeformed or is deformed less than a predetermined limit. The visual deformation indicator 130 may advantageously facilitate a worker 100 selecting a fall-protection safety connector 115 that is in a predetermined specified readiness condition.

Figure 2A:
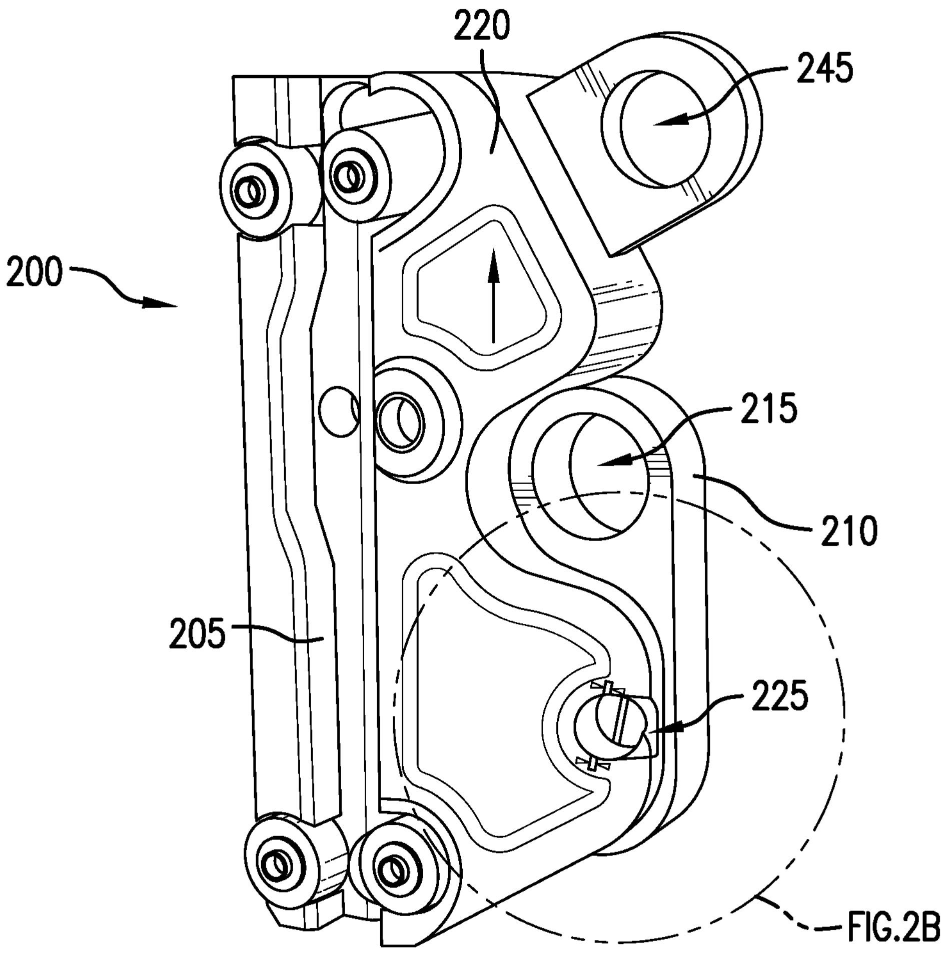
FIGS. 2A-2C depicts an exemplary fall-protection safety connector with an exemplary aperture window type of visual deformation indicator.
Figure 2B:
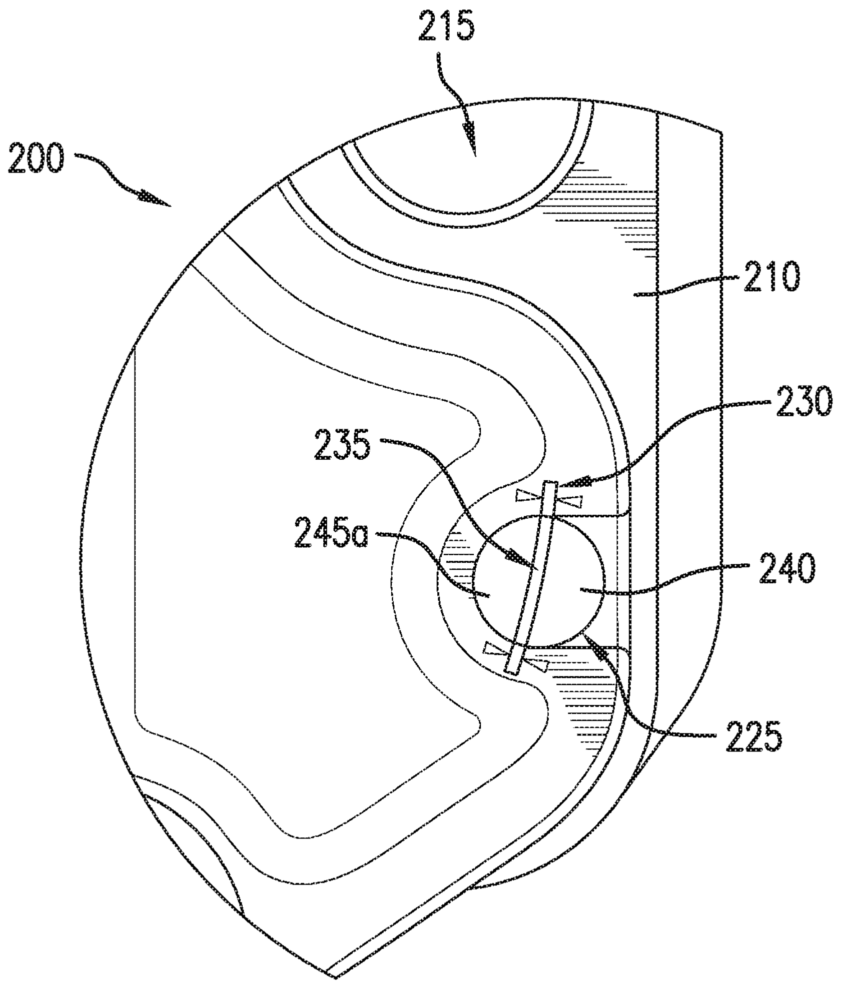

FIGS. 2A-2B depicts an exemplary fall-protection safety connector with an exemplary aperture window type of visual deformation indicator. In FIG. 2A, an exemplary fall-protection safety connector 200 includes a securement interface 205. The securement interface 205 may provide a secure slideable coupling to a guide rail, for example. The fall-protection safety connector 200 may include a deformation member 210. The deformation member 210 may be configured to absorb energy during a deformation event, such as a fall event, by deforming in response to a force imparted to the deformation member 210. In some embodiments, the deformation member 210 may be configured to plastically deform in response to a force imparted thereto. In an exemplary embodiment, a deformation member 210 may be configured to shear in response to a force imparted thereto. The deformation member 210 may have a dynamic attachment aperture 215 configured to couple to a lanyard. The lanyard may then be adapted to couple to a fall-protection harness worn by auser.

In FIG. 2B, a blowup view of the depicted fall-protection safety connector 200 shows an exemplary base member 220 having an alignment window 225. Exemplary alignment indicia 230 are shown on the base member 220 near the alignment window 225. Within the alignment window 225 the deformation member 210 may be seen. A gap 235 between a dynamic end 240 and a static end 245*a* of the exemplary deformation member 210 can be seen within the alignment window 225. When the deformation member 210 is in an initial or undeformed condition, the gap 235 may align with the alignment indicia 230. When the deformation member 210 has deformed in response to a fall event, the gap 235 may increase in dimension such that the gap 235 may no longer align with the alignment indicia 230. The visual misalignment of the gap 235 and the alignment indicia 230 may indicate to a user that the fall-protection safety connector is out of specification, for example. In some embodiments, a visual misalignment may indicate to a user that the deformation member 210 has been deformed.

Figure 2C:
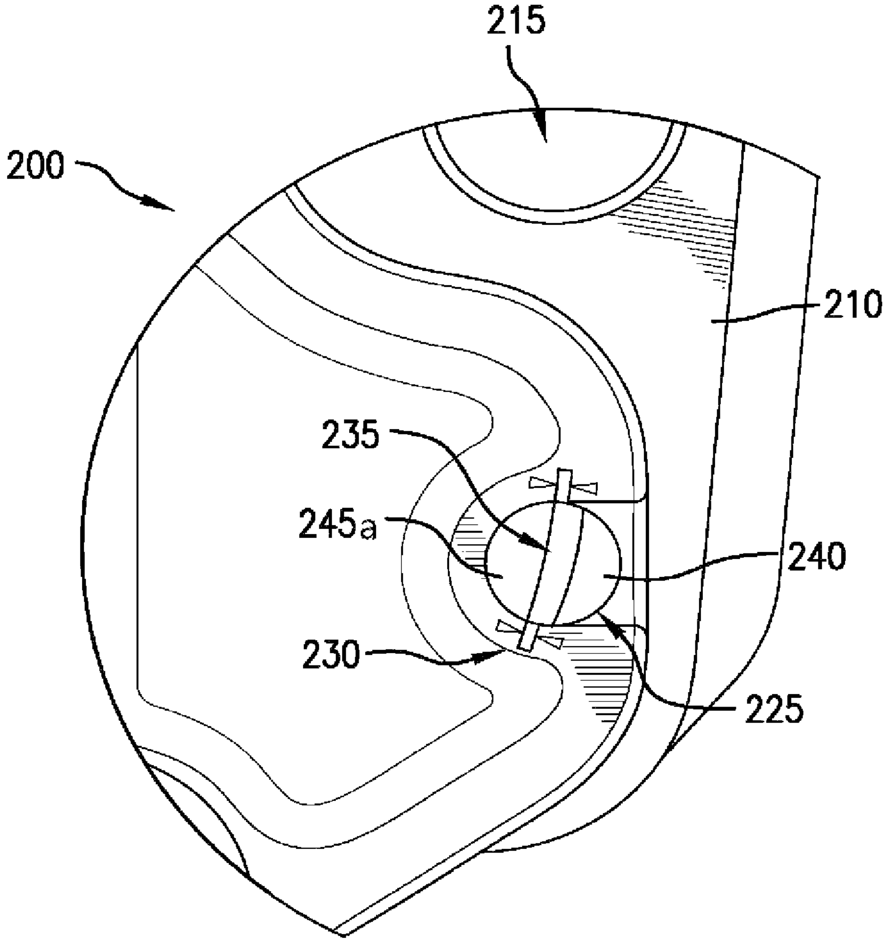

In FIG. 2C, a blowup view of the depicted fall-protection safety connector 200 (in a deformed state) shows an exemplary base member 220 having an alignment window 225. Exemplary alignment indicia 230 are shown on the base member 220 near the alignment window 225. Within the alignment window 225 the deformation member 210 may be seen. A gap 235 between a dynamic end 240 and a static end 245*a* of the exemplary deformation member 210 can be seen within the alignment window 225. FIG. 2B depicts an initial or undeformed condition of the safety connector 200, which is contrasted with FIG. 2C, that depicts a deformed condition of the safety connector 200. Accordingly, as shown in FIG. 2C, when the deformation member 210 has deformed in response to a fall event, the gap 235 increases in dimension such that the gap 235 may no longer align with the alignment indicia 230. The size of the gap 235 increases due to separation between the static end 245*a* and the dynamic end 240, each end 240, 245*a* having respective gap-defining surfaces. The visual misalignment of the gap 235 and the alignment indicia 230 may indicate to a user that the fall-protection safety connector is out of specification, for example. In some embodiments, a visual misalignment may indicate to a user that the deformation member 210 has been deformed.

In the FIG. 2A embodiment, the fall-protection safety connector 200 has a static attachment aperture 245. The static attachment aperture 245 may be configured to couple to a lanyard or a carabiner, for examples. The fall-protection safety connector 200 may be moored to an anchor via the static attachment aperture 245, for example. The fall-protection safety connector 200 may have a latch that latches to a guide rail in response to a fall event. In some embodiments, the latch may inhibit the fall-protection safety connector 200 from sliding in one direction when latched. In some embodiments, the latch may inhibit the fall-protection safety connector 200 from sliding in two directions when latched. In some embodiments, the fall-protection safety connector 200 may freely slide in two directions along a guide rail when the user is traveling along the rail, but not in a fall event. For example, the user may travel up or down a ladder that has a guide rail, while remaining slideably coupled to the guide rail. In some embodiments, the user may ever lean back, imparting a lateral force upon the fall-protection safety connector 200 without the latch latching to the guide rail.

In an exemplary embodiment, the latch may engage the slide rail, only when the vector direction of the force upon the fall-protection safety connector 200 is consistent with a fall event. In some embodiments, the latch may engage the slide rail, only when the speed of movement of the connector 200 along the guide rail exceeds a predetermined threshold, for example. In some embodiments, the latch may engage the slide rail when both a speed of movement of the connector 200 exceeds a predetermined threshold, and a vector direction of a force incident upon the connector is consistent with a fall event. Exemplary fall-protection safety connectors are described in the Miller GlideLoc Ladder System Kits Brochure (https://www.millerfallprotection-.com/pdfs/GlideLocBrochure.pdf, last visited Jun. 27, 2014).

Figure 3A:
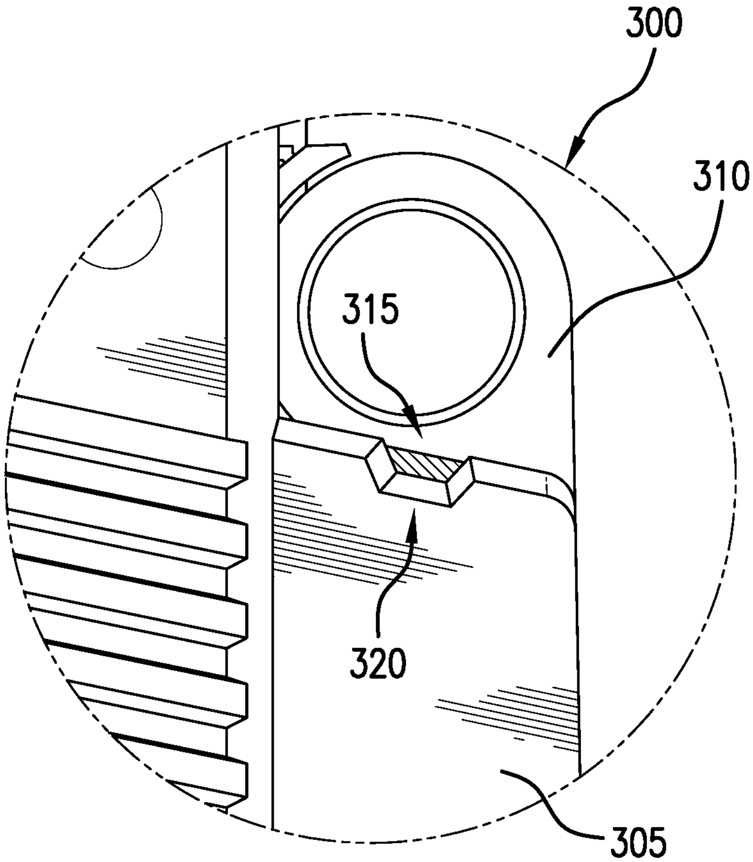
FIGS. 3A-3B depict an exemplary slide window deformation indicator.
Figure 3B:
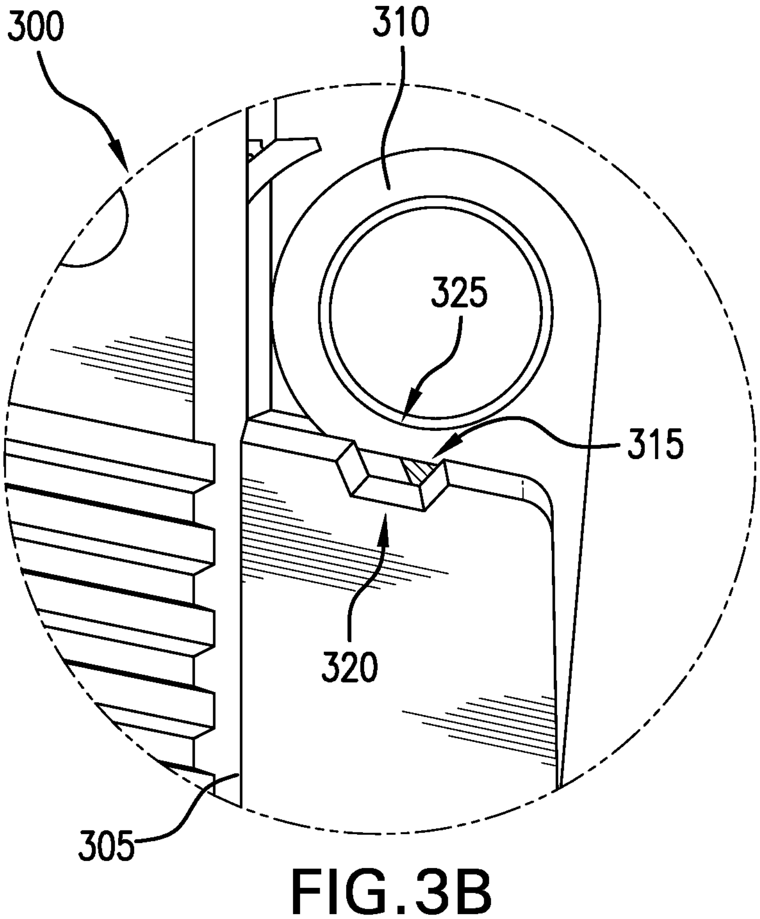

FIGS. 3A-3B depict an exemplary slide window deformation indicator. In FIG. 3A, an exemplary undeformed fall-protection safety connector 300 includes an anchor attachment portion 305 and a user attachment portion 310. Between the anchor attachment portion 305 and the user attachment portion 310 is a deformation region (not depicted). The relative juxtaposition of the anchor attachment portion 305 and the user attachment portion 310 varies in relation the amount and/or nature of deformation of the deformation region. In the FIG. 3A depiction, an [green/hatched] indicator 315 may be seen in a slide window 320 indicating a readiness condition of the fall-protection safety connector 300. In the FIG. 3B depiction, a [red/solid]

indicator 325 may be seen in the slide window 320 indicating an unreadiness condition of the fall-protection safety connector 300.

Figure 4:
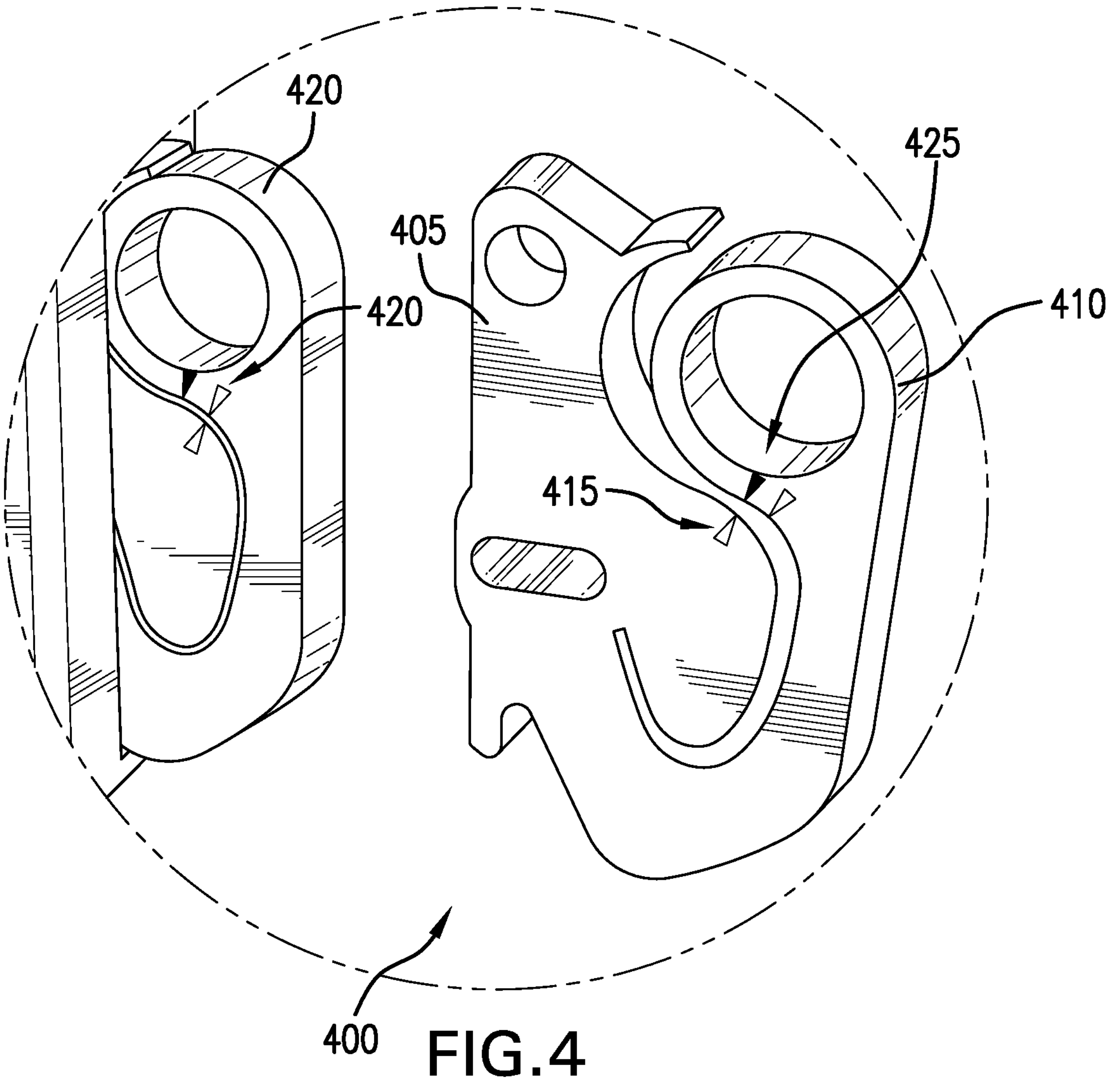
FIG. 4 depicts an exemplary deformation member having exemplary ruler type alignment indicators.

FIG. 4 depicts an exemplary deformation member having exemplary ruler type alignment indicators. In FIG. 4, an exemplary deformation member 400 has a reference end 405 and a moveable end 410. In the depicted embodiment, a reference indicator 415 is on the reference end 405. A safe indicator 420 and an unsafe indicator 425 are depicted on the moveable end 410. When the deformation member 400 is in an undeformed condition, the safe indicator 420 aligns with the reference indicator 415. When the deformation of the deformation member 400 is sufficient to align the unsafe indicator 425 with the reference indicator 415, then the remaining deformation capability of the deformation member 400 may be less than a predetermined minimum threshold. This unsafe indication may inform the user that the deformation member must be replaced, for example.

Figure 5A:
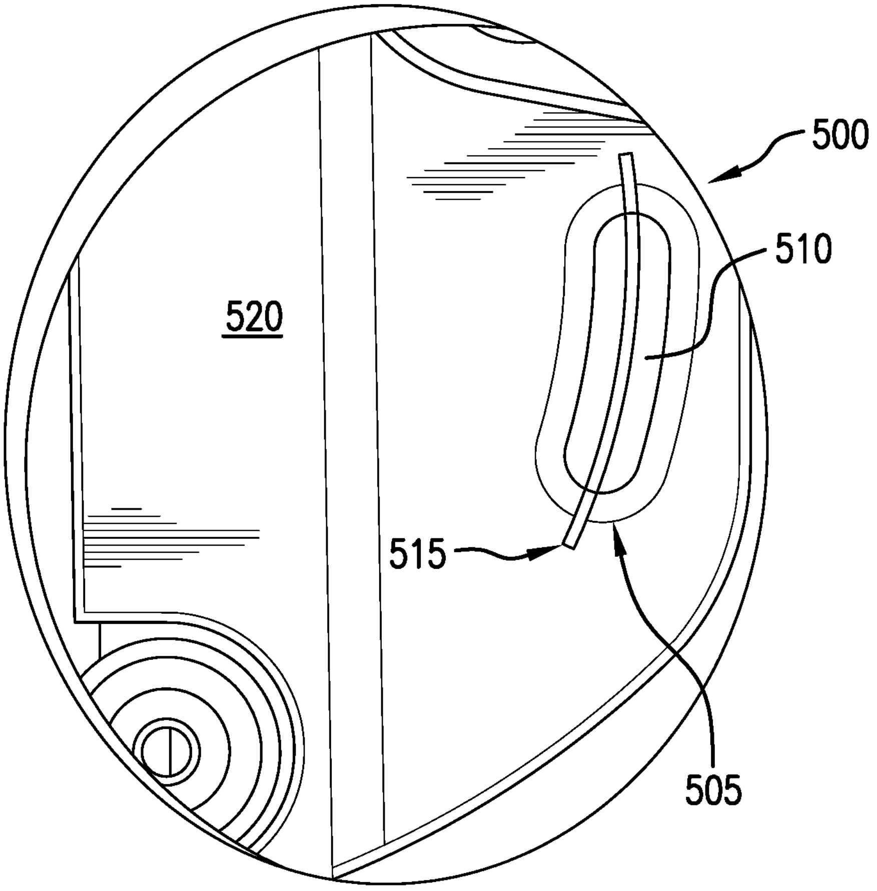
FIGS. 5A-5B depict depicts exemplary varieties of window type alignment indicators.
Figure 5B:
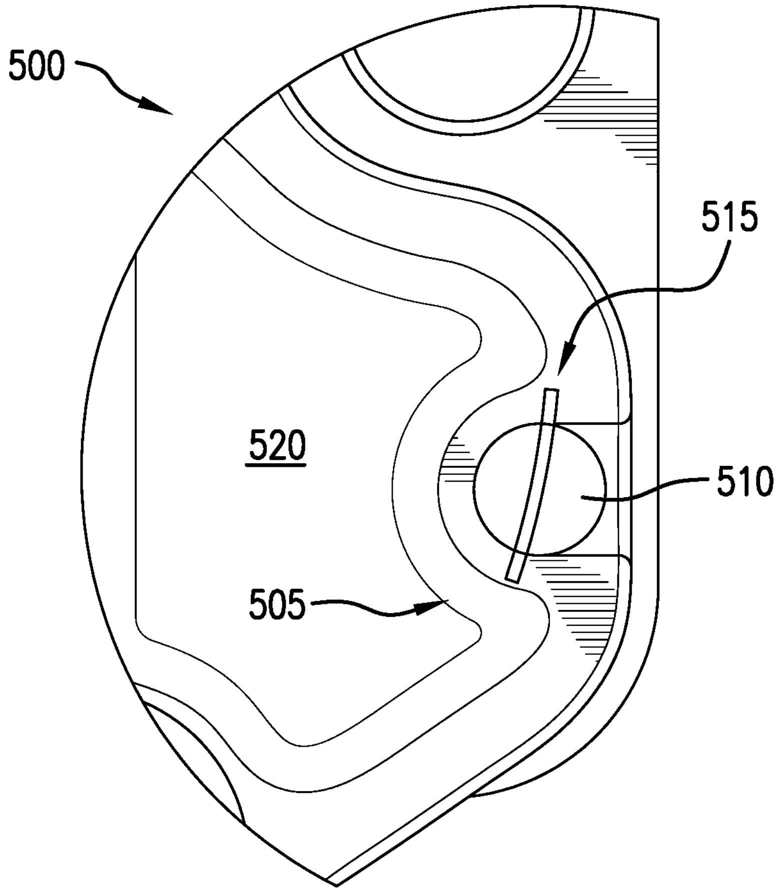

FIGS. 5A-5B depict depicts exemplary varieties of window type alignment indicators. In FIGS. 5A-5B exemplary fall-protection safety connectors 500 have exemplary window apertures 505 that reveal exemplary energy-absorbing deformation members 510. Each of these embodiments have static alignment indicia 515 on a static portion 520 of the fall-protection safety connectors 500. In some embodiments, the static alignment indicia 515 align with a dynamic alignment indicia on a dynamic portion of the fall-protection safety connector 500, when the deformation members 510 are in an original and/or undeformed condition.

Figure 6A:
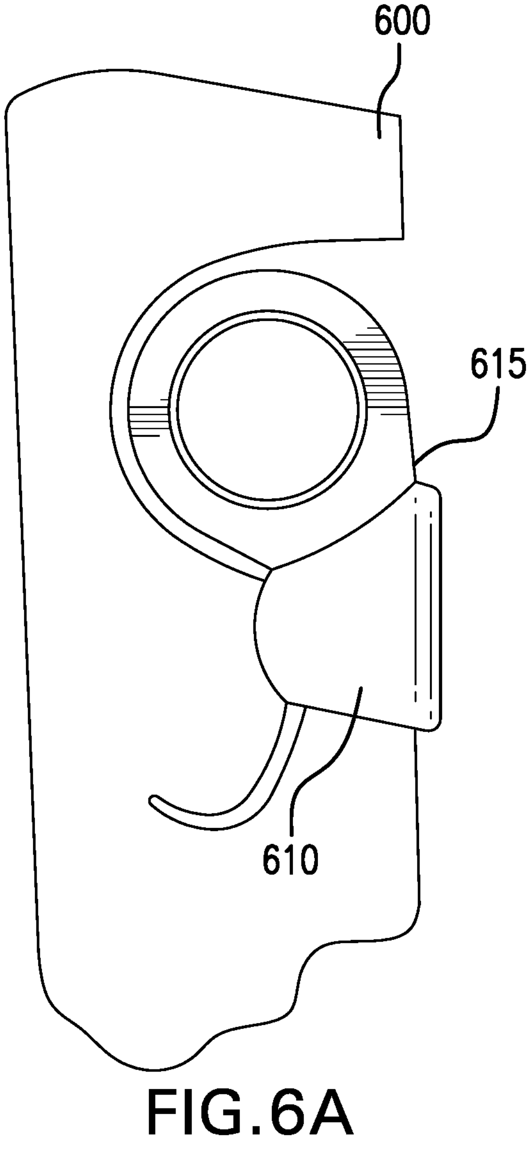
FIG. 6A-6B depict an exemplary concealed alignment indicator.
Figure 6B:
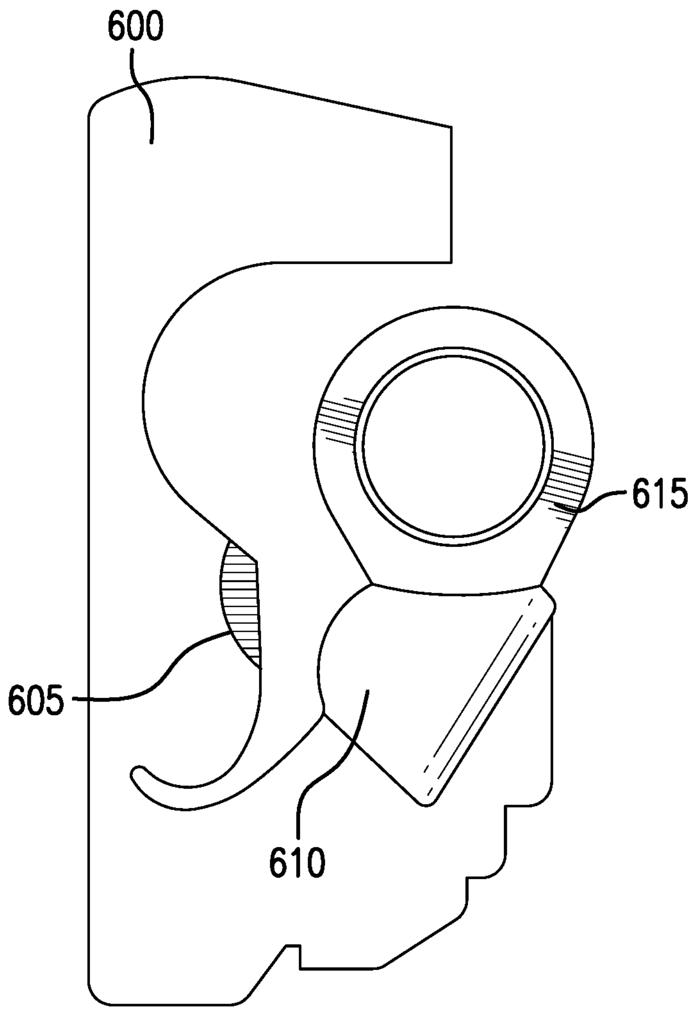

FIGS. 6A-6B depict an exemplary concealed alignment indicator. In FIGS. 6A-6B exemplary fall-protection safety connectors 600 have exemplary concealed alignment indicators 605. In the depicted embodiment, a concealment member 610 conceals the alignment indicator when a deformation member 615 is in an undeformed condition. The alignment indicator 605 may then be revealed when the deformation member 615 is deformed beyond a predetermined threshold limit, for example. In this embodiment, when the concealed alignment feature 605 is revealed, the fall-protection safety connector 600 may be unsafe for use, for example.

Figure 7:
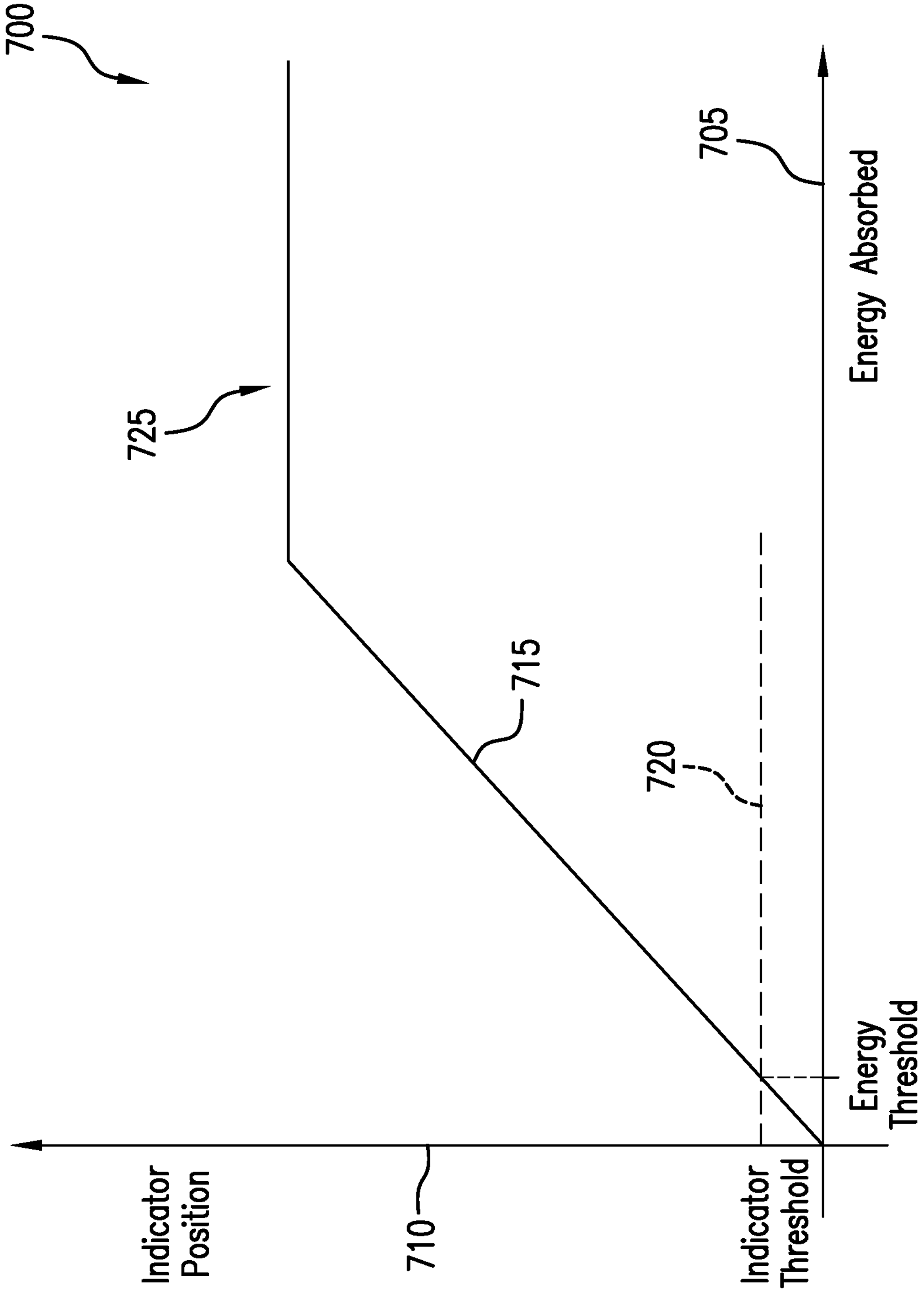
FIG. 7 depicts a graph of an exemplary relation between a dynamic alignment indicator position and absorbed energy of a deformation member.

FIG. 7 depicts a graph of an exemplary relation between a dynamic alignment indicator position and absorbed energy of a deformation member. In FIG. 7, an exemplary graph 700 has a horizontal axis 705 that represents the energy absorbed by a deformable energy-absorbing member. The graph 700 has a vertical axis 710 that represents an indicator position of a fall-protection safety connector. The indicator position may represent an separation distance between a static indicator and a dynamic indicator coupled to opposite ends of a deformation member, for example. The graph 700 depicts a functional relation 715 between the indicator position and the energy absorbed by the deformable energy-absorbing member. An indicator threshold limit 720 may represent a reference "unsafe" indicator that when aligned with a dynamic indicator represents an unsafe condition. A deformation limit regime 725 may represent the limit of deformation to the deformable energy-absorbing member.

Although various embodiments have been described with reference to the Figures, other embodiments are possible. For example, some embodiments may be configured to attach to a fall-protection safety harness and worn by a user. In an exemplary embodiment, a fall-protection safety connector having visual deformation indicia may be affixed to a horizontal lifeline system. In an exemplary embodiment, a fall-protection safety connector having visual energy absorption indicia may be configured to attach to a container.

In some embodiments, a deformation member having visual deformation indicia may be attached to a seat restraint in a vehicle. For example, a baby car seat may be coupled to a seat of a car via a deformation member having visual deformation indicia. In some embodiments, a deformation member having visual deformation indicia may be used in crash testing, for example.

In various embodiments, various types of deformation sensing modules may be used to obtain a measure of deformation of a deformation member. For example, various types of electronic sensors may be used to perform some measure of deformation. A proximity sensor, for example may obtain a measure of a gap distance between a dynamic portion and a static portion of a plastically deformable member. A contact switch may be broken, for example, when a deformation member is deformed more than a predetermined amount. In some embodiments, a strain gauge may indicate the strain induced into a member resulting from a deformation, for example.

In an exemplary embodiment deformation indicia may be readable in a variety of manners. For example, in some embodiments, the deformation indicia may include visible markers readable by a human and/or a machine. In some embodiments, the indicia may be tactilely readable by a human and/or a machine. In some embodiments, the indicia may be audible, for example. Various electronic and/or optical signals may be generated by a deformation sense module. For example, a deformation sensor may produce a signal in response to the measure of a gap distance. The signal may be wirelessly communicated to a receiving station in some embodiments. In an exemplary embodiment, an infrared LED may communicate a signal representative of a deformation measurement to an infrared receiver.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A fall protection safety connector (200) with an integral visual indicator of readiness, the fall protection safety connector (200) comprising:

a base member (220);

a deformation member (210) comprising a first end (405) securely attached to the base member (220) to define a static end (245*a*) and a second end (410) to define a dynamic end (240), wherein the deformation member (210) is adapted to deform in shape in response to a deformation force imparted on the second end (410) relative to the first end (405);

an alignment window (225) on the base member (220); and, an alignment indicia (230) on the base member (220) near the alignment window (225), wherein the static end (245*a*) and the dynamic end (240) define a gap (235) between the base member (220) and the deformation member (210), wherein when the deformation member (210) deforms a predetermined amount, then the gap (235) no longer aligns visually with the alignment indicia (230), such that a gap-defining surface of the static end remains stationary relative to the alignment indicia, while a gap-defining surface of the dynamic end is translated away from the static end to visually misalign the gap-defining surface of the dynamic end with the alignment indicia.

2. The fall protection safety connector of claim 1, wherein visual misalignment between the gap (235) and the alignment indicia (230), as visually presented via the alignment window (225), indicates that the deformation member (210) has been deformed and that the gap (235) has widened due to separation between the static end (245*a*) and the dynamic end (240).

3. The fall protection safety connector of claim 1, further comprising a securement interface (205) for securely coupling the base member (220) to a securement member (120).

4. The fall protection safety connector of claim 3, wherein the securement interface (205) is adapted to slideably couple to the securement member (120).

5. The fall protection safety connector of claim 3, wherein the securement interface (205) comprises an aperture in the base member (220) or in the first end (405) of the deformation member (210).

6. The fall protection safety connector of claim 3, wherein the securement member (120) comprises a guide rail (120).

7. The fall protection safety connector of claim 3, wherein the securement member (120) comprises a ladder.

8. The fall protection safety connector of claim 1, further comprising an aperture (215) in the second end (410) of the deformation member (210) for making connection to a safety lanyard, the safety lanyard adapted to couple to a fall protection harness (105) worn by a user.

9. The fall protection safety connector of claim 1, wherein the gap (235) can be seen within the alignment window (225), wherein, when the deformation member (210) is in an initial or undeformed condition, the gap (235) visually aligns with respect to the alignment indicia (230).

10. The fall protection safety connector of claim 1, further comprising a latching member that latches the fall protection safety connector (200) to a securement member in response to the deformation force exceeding a predetermined threshold.

11. The fall protection safety connector of claim 1, wherein the alignment indicia (230) comprises a visually perceptible alignment feature.

12. The fall protection safety connector of claim 1, wherein a static indicator (230) comprises an alignment feature that is tactilely perceptible when touched.

13. The fall protection safety connector of claim 1, further comprising a fall detection module having a safe indicator and an unsafe indicator, the unsafe indicator being activated when the deformation force exceeds a predetermined threshold.

14. The fall protection safety connector of claim 13, further comprising an emergency transmitter that activates when the deformation force exceeds the predetermined threshold.

15. A fall protection safety connector (200) with an integral visual indicator of readiness, the fall protection safety connector (200) comprising:

a base member (220);

a first end (405) of a deformation member (210) securely attached to the base member (220), wherein the deformation member (210) is adapted to deform in shape in response to a deformation force imparted on a second end (410) relative to the first end (405);

an alignment window (225) provided on the base member (220);

a static indicator (230) provided on the base member (220) near the alignment window (225);

wherein a static end (245*a*) of the base member (220) and a dynamic end (240) of the deformation member (210) define a gap (235) between the base member (220) and the deformation member (210), wherein the gap (235) can be seen within the alignment window (225), and, wherein when the deformation member (210) is in an initial or undeformed condition, the gap (235) aligns with the static indicator (230).

* * * * *